Aug. 1, 1933. R. RODERWALD 1,920,525
METHOD FOR MANUFACTURING TOOTHED V-TYPE BELTS OF RUBBER IMPREGNATED CLOTH
Filed Oct. 20, 1930 3 Sheets-Sheet 1
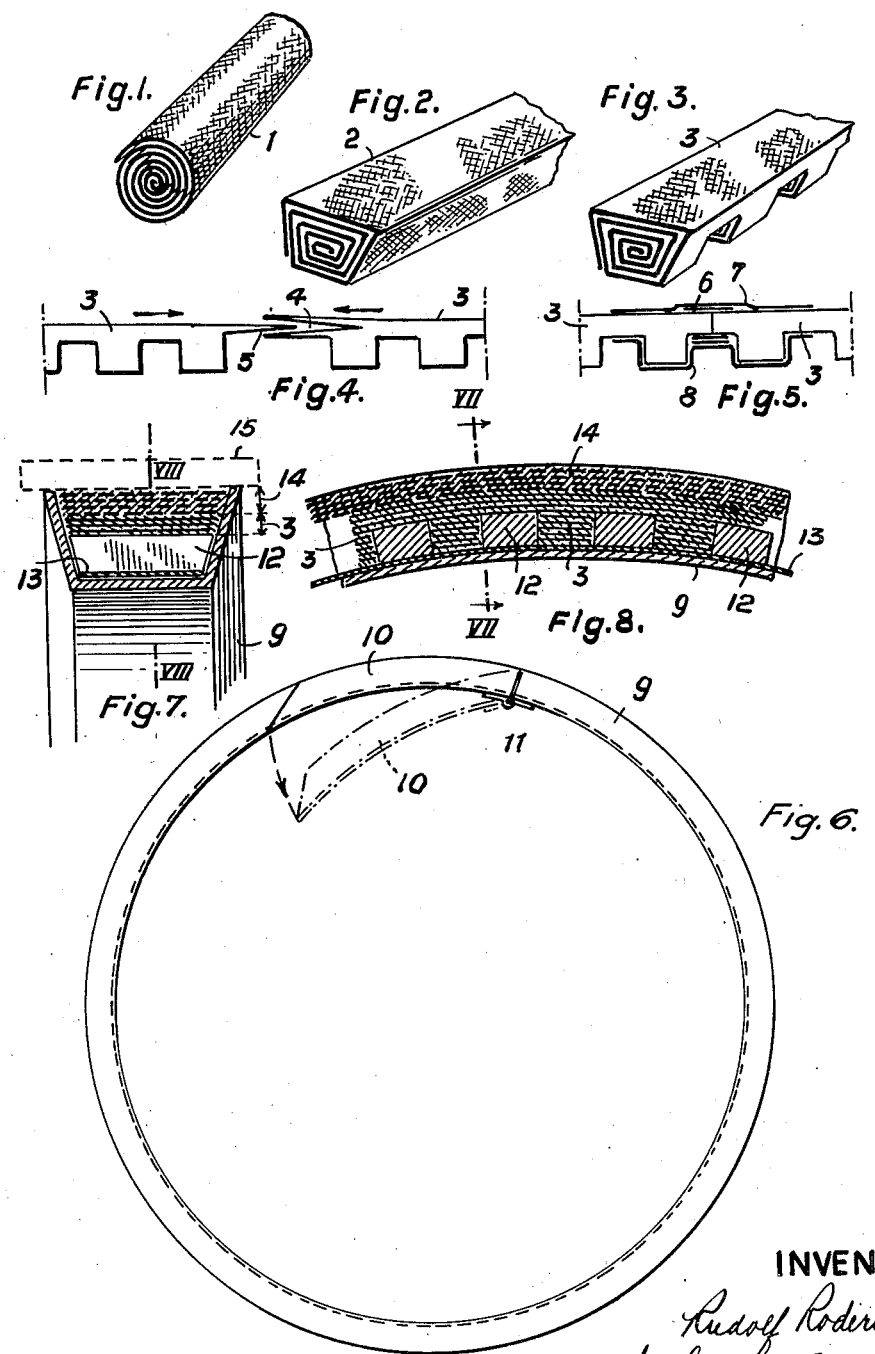
INVENTOR:
Rudolf Roderwald
by his attorney

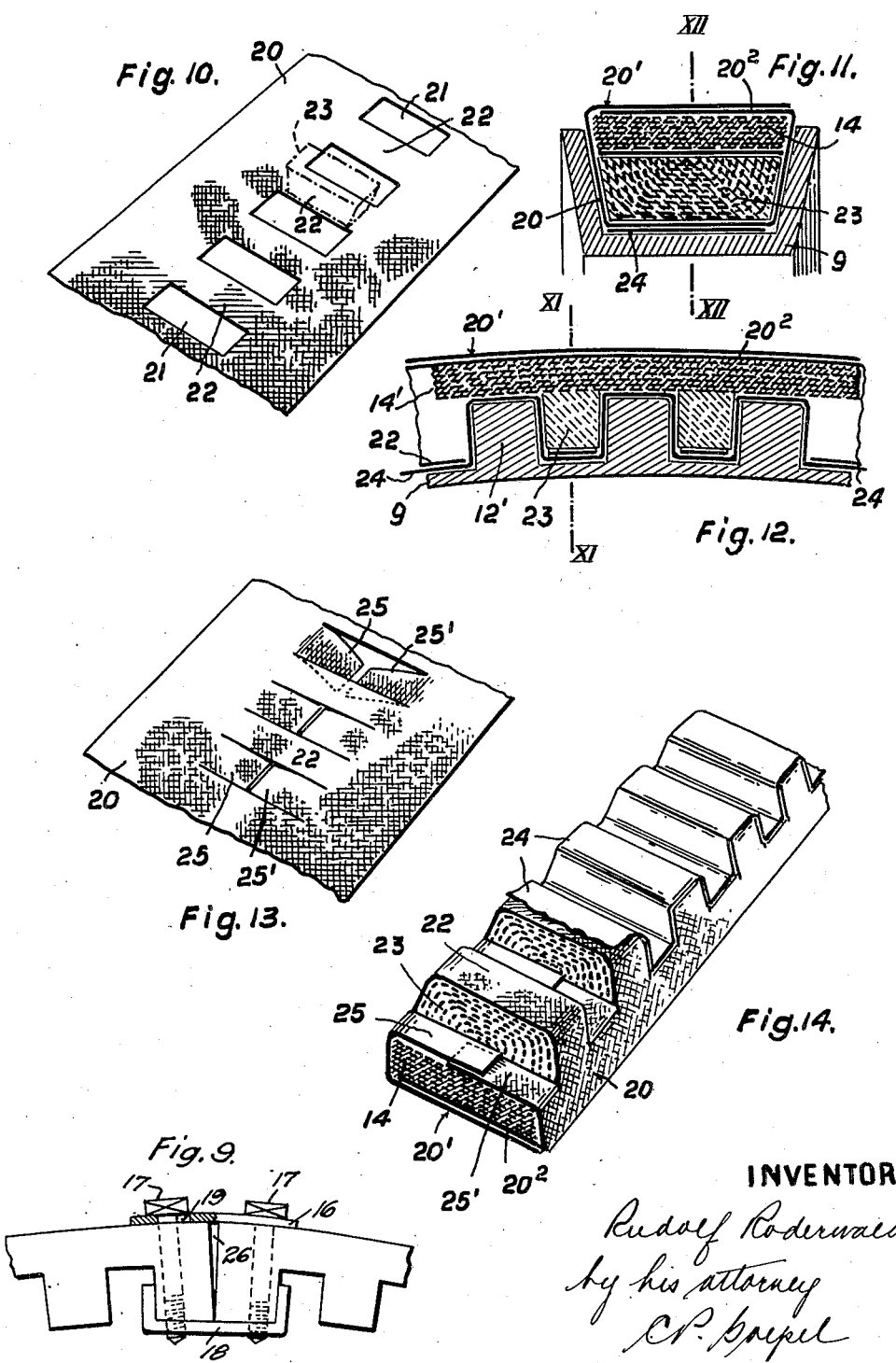

Aug. 1, 1933.   R. RODERWALD   1,920,525
METHOD FOR MANUFACTURING TOOTHED V-TYPE BELTS OF RUBBER IMPREGNATED CLOTH
Filed Oct. 20, 1930   3 Sheets-Sheet 3

INVENTOR:
Rudolf Roderwald
by his attorney

Patented Aug. 1, 1933

1,920,525

UNITED STATES PATENT OFFICE 1,920,525

METHOD FOR MANUFACTURING TOOTHED V-TYPE BELTS OF RUBBER IMPREGNATED CLOTH

Rudolf Roderwald, Berlin, Germany, assignor to The Dayton Roderwald Company, Dayton, Ohio, a Corporation of Ohio Application October 20, 1930, Serial No. 489,919, and in Germany November 14, 1928

5 Claims. (Cl. 154—4)

This invention relates to improvements in toothed V-shaped belts formed of impregnated rubber cloth, and has for its object to provide such a belt so formed that in its formation no valuable material is lost by stamping, cutting or otherwise removing parts of the material of the belt to form the teeth. This result is obtained by using materials of two different qualities, one a cheap material from which the teeth are formed, and the other a more valuable material from which that part of the belt bearing the strain is formed.

It is also an object of this invention to form a belt from a composite strip of belt material, with the ends interconnected and secured to form the finished belt.

For the purpose of illustration there is shown in the accompanying drawings preferred embodiments of the belt constructed according to the present method.

Referring to the drawings:

Figure 1 shows a perspective view of a spirally wound piece of rubber impregnated cloth.

Figure 2 is similar to Figure 1 but shows the piece of belt material pressed into wedge-shaped form.

Figure 3 shows a belt similar to that shown in Figure 2, but with parts of the belt material removed to produce teeth.

Figures 4 and 5 illustrate two methods by which the free ends of the belt, as shown in Figure 3, may be united.

Figure 6 shows in side elevation a mold used in forming and building up the belt.

Figure 7 shows a cross section through the mold, with the belt contained therein, according to the line VII—VII of Figure 8.

Figure 8 shows a longitudinal section through one part of the belt and the mold, according to the line VIII—VIII of Figure 7.

Figure 9 shows in side elevation one fastening means for uniting the free ends of a belt section.

Figure 10 is a perspective view of a rubber impregnated piece of cloth, provided with apertures, and used as a belt wrapper.

Figure 11 is a cross section through the mold and the belt contained therein, on the line XI—XI of Figure 12.

Figure 12 is a longitudinal section through the mold and the belt on the line XII—XII of Figure 11.

Figure 13 is a perspective view of a piece of rubber impregnated cloth provided with slots, and forming a belt wrapper.

Figure 14 is a perspective view of the inside of a finished belt.

Figure 15:
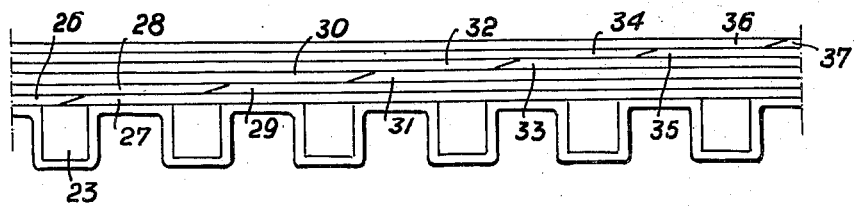
Figures 15 and 16 illustrate a method by which the ends of the belt section may be united.

In Figures 1 and 9 there is illustrated one method of forming a belt from a piece of rubber impregnated cloth of relatively cheap quality. This cloth is rolled spirally to form a roll such as that shown in Figure 1, and designated by the numeral 1. After the cloth has been wound into this round roll, as shown in Figure 1, it is suitably pressed for giving it the wedge-shape shown in Figure 2, and indicated by the numeral 2.

After the roll has been pressed into the shape shown in Figure 2, sections are cut therefrom to produce a belt section as indicated by the numeral 3, and shown in Figure 3. This figure shows only the lower or inner part of the belt, and not the whole belt. The ends of the belt section, as shown in Figure 3, may be united by various means.

As shown in Figure 4, one end of the belt section has formed therein a slot 4 for receiving a tongue 5, formed on the other end of the belt section. After the tongue has been inserted into the slot the parts are caused to adhere in any suitable manner, particularly by the use of the adhesive material forming the belt. Or the ends may be united in the manner shown in Figure 5 by the use of a transversely wound band 6. In this figure the two ends of the belt are brought together and held by means of this band, and cooperating with the band to hold the ends together is a longitudinal outer band 7 and a longitudinal inner band 8. The ends of the belt may also be united in the manner shown in Figure 9, later to be described. The belt thus formed is placed in the mold 9, shown in Figure 6.

The mold is circular in shape and has a part 10 hinged at one end 11 to the body of the mold. The other end of this part 10 fits against a correspondingly shaped part of the body of the mold. This part 10 forms an integral part of the whole mold, but may be broken away so that the belt may be removed from the mold, or the initial form such as shown in Figure 3 placed in the mold.

After the belt as formed thus far has been placed in the mold and the part 10 so positioned as to form a continuation of the body of the mold, the outside part of the belt is built up. In order to provide supports for the belt between the teeth, tooth members 12 are provided in connection with a steel band 13 adapted to be laid in the mold, as shown in Figure 8.

After the belt thus initially formed has been placed within the mold a plurality of layers 14 of valuable material is wound around the belt thus formed, the material used for forming the part of the belt shown in Figure 3 being cheap material. After the layers 14 have been wound upon the initially formed part of the belt, a cover 15 is applied around the outside of the mold, which presses the contents of the mold against the bottom and the side walls. The whole is now in condition for vulcanization and thereafter to be removed from the mold.

The outer part formed by the layers 14 may be of a plurality of layers as here described, or instead of the plurality of layers, a single layer may be used. The circular form of mold shown in Figure 6 is preferred since it may be rotated for the application of the layers 14 to the belt, and in the application the material forming the layers may be stretched and drawn.

The vulcanized belt, when removed from the mold, has a smooth surface, and all layers are interconnected as well as the interior of the belt, and the angular edges of the belt are correct because they always correspond to the angular edges of the mold.

A belt thus formed has an advantage over belts otherwise formed in that the layers 14 are bent in a manner similar to that in which they are bent in passing over pulleys. Instead of the belt ends being united in the manner shown in Figures 4 and 5, they may be united by means of plates 16 and 18, one on the outside and one on the inside of the belt, connected by bolts 17, one through each end of each plate and one end of the belt.

Each bolt has a head on one end, which engages the outside face of the plate 16, adjacent elongated slots 19, while the other ends of these bolts are threaded and engage suitable threaded holes in the plate 18. The purpose of the slots 19 is to allow for the bending and straightening of the belt at this point. There is also provided, for permitting the movement necessary at the joined ends of the belt, a U-shaped notch or gap 26.

In Figure 10 there is shown part of a strip of impregnated rubber cloth 20, which has holes 21 therein with sections 22 of the strip between the holes. Fixed in the mold are teeth 12', as shown in Figure 12. The strip of cloth, a section of which is shown in Figure 10, is placed in a mold similar to that shown in Figure 12, with the teeth 12' projecting through the holes 21, with the parts 22 fitting between the teeth 12' of the mold.

Before the strip as shown in Figure 10 is placed in the mold a coating band 24 may be applied along the inside of the mold, over and between the teeth, as shown in Figure 12. Placed between each adjacent tooth 12' is a tooth 23, either of rubber or impregnated cloth of cheap quality. These teeth rest upon the parts 22 of the impregnted strip of cloth shown in Figure 10.

On the outside of the teeth 23 and the coating band 24 is wound one or more layers of impregnated rubber cloth 14', similar to the layers 14. Instead of having a plurality of layers, a single layer may be used. These layers are applied in a manner similar to the manner in which the layers 14 are applied. After these layers have been applied the free sides of the strip 20 are folded over the outside of the belt and are indicated by the numerals 20' and 20². The belt is now in condition to be vulcanized in a manner similar to that in which the belt shown in Figure 6 is vulcanized.

Instead of using the form of strip as shown in Figure 10 a form 21³, similar to that shown in Figure 13, may be used. In this form there is a plurality of transverse slits forming transverse sections, every alternate one of which is slit longitudinally of the strip to form wings 25 and 25'. The unslit parts are indicated by the numeral 22'. This strip is placed over the teeth, similar to the way in which the strip shown in Figure 10 is, with the exception that the wings 25 and 25' extend up the edges of the teeth.

Figure 16:
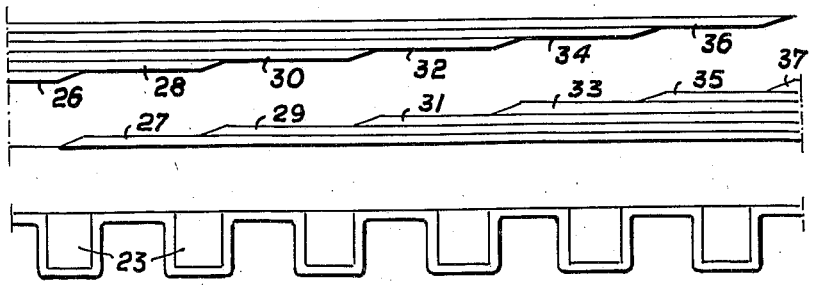

Figures 15 to 18, inclusive illustrate two different ways of connecting the ends of the belt. In Figures 15 and 16 the numerals 26, 28, 30, 32, 34 and 36 represent one end of each of a plurality of layers arranged in step relationship with one another, while the numerals 27, 29, 31, 33, 35 and 37 indicate respectively the other ends of the same layers, arranged in step relationship to each other, the reverse of the manner in which the first-named ends of the layers are arranged.

By this arrangement the ends 26 and 27 abut and slightly overlap because of their tapered formation. The ends of the layers 28 and 29 likewise overlap, and so do the ends 30 and 31, 32 and 33, 34 and 35 and 36 and 37. When the layers are thus united a belt as shown in Figure 15 is formed.

Figure 18:
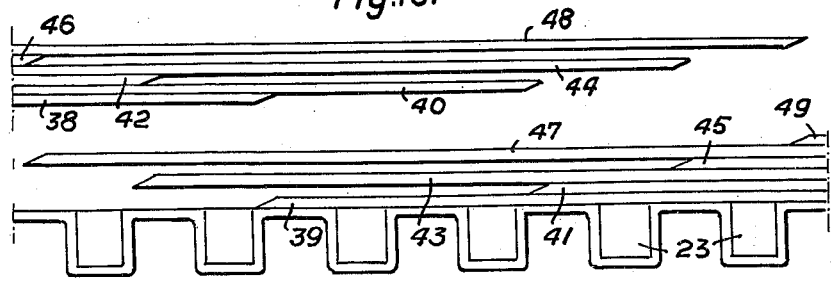

Instead of having the layers terminate progressively, as shown in Figures 15 and 16, they may terminate as shown in Figure 18. The ends 38 and 39 of the inside layer unite at one point. The ends 40 and 41 of the next outer layer unite at a point remote from the union of the inside layer, while the ends 42 and 43 of another layer adjacent the one having the ends 40 and 41, unite with each other so that the points of union are in staggered relationship to the points of union of the other two layers.

Figure 17:
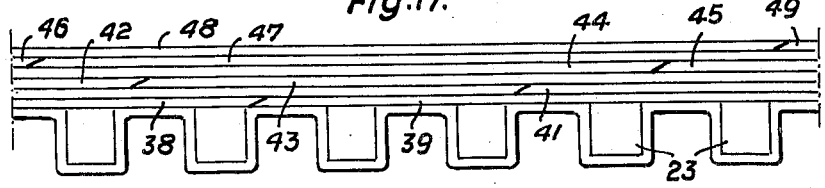
Figures 17 and 18 show a modified form of belt connection.

The end 44 of another layer is united to the end 45 in staggered relationship to the union between the other before-mentioned layers. In like manner the ends 46 and 47 are united, and also the ends 48 and 49 of the outside layer. These layers are thus united in staggered relationship, as shown in Figure 17, so there is no system of arrangement between the united ends.

The inside part of the belt, as shown in Figures 15, 16, 17, and 18, is formed in the same manner that the inside part of the belt shown in the other figures is formed.

It will be understood that I desire to comprehend within my invention such modifications as come within the scope of my claims and my invention.

Having thus fully described my invention, what I claim as new and desire to secure by Letters Patent, is:

1. A method of manufacturing toothed V-type belts of rubber impregnated cloth, consisting in that a surrounding band provided with apertures is laid into a toothed mold, so that the teeth of the mold enter and penetrate the said apertures, then teeth of a cheap material are brought into the gaps between the teeth of the mold, then the teeth of the cheap material and the teeth of the mold are covered by a plurality of layers of a valuable material, then the surrounding band is closed by overlapping its ends on the outer side of the uppermost layer of valuable material, then the said mold is closed and the whole vulcanized.

2. A method of manufacturing toothed V-type belts of rubber impregnated cloth, consisting in that a surrounding band provided with apertures and wings on the small sides of the said apertures is laid into a toothed mold so that the teeth of the said mold enter and penetrate the said apertures and bend the said wings outwardly, then the teeth of a cheap material are brought into the gaps between the teeth of the mold, then all of the teeth are covered by a plurality of layers of a valuable material, then the surrounding band is closed on the wide side of the belt, the mold closed and the whole vulcanized.

3. A method of manufacturing toothed V-type belts of rubber impregnated cloth, consisting in that a coating band is brought on the bottom of a toothed mold of wedge-shaped cross section, then a surrounding band provided with apertures is laid into the said toothed mold so that the teeth of the mold enter and penetrate the said apertures, then teeth of a cheap material are brought into the gaps between the teeth of the mold, then all of the teeth are covered by a plurality of layers of a valuable material, then the surrounding band is closed on the wide side of the belt, the mold closed and the whole vulcanized.

4. A method of manufacturing toothed V-type belts of rubber impregnated cloth, consisting in that the toothed part of the belt is built up of a cheap material and is brought into a toothed mold of wedge-shaped cross section and covered by a plurality of layers of valuable material, then the said mold is closed, the whole vulcanized, the belt removed from the mold, cut to form two ends, and then the ends are interconnected by a fastener with bent plates and elongated apertures for the bolts therein.

5. A method for manufacturing toothed V-type belts of rubber impregnated cloth, consisting in that a surrounding band provided with apertures is laid into a toothed mold, then teeth of a cheap material are brought into the gaps between the teeth of the mold, then all of the teeth are covered by a plurality of layers of valuable material in such a way that the joints of the layers are covered at both sides by an uninterrupted piece of the adjacent layers, then the surrounding band is closed on the wide side of the belt, the mold closed and the whole vulcanized.

RUDOLF RODERWALD.